W. C. WHITE.
EGG SHUCKER.
APPLICATION FILED MAR. 9, 1921.
1,397,306.
Patented Nov. 15, 1921.
3 SHEETS—SHEET 3.
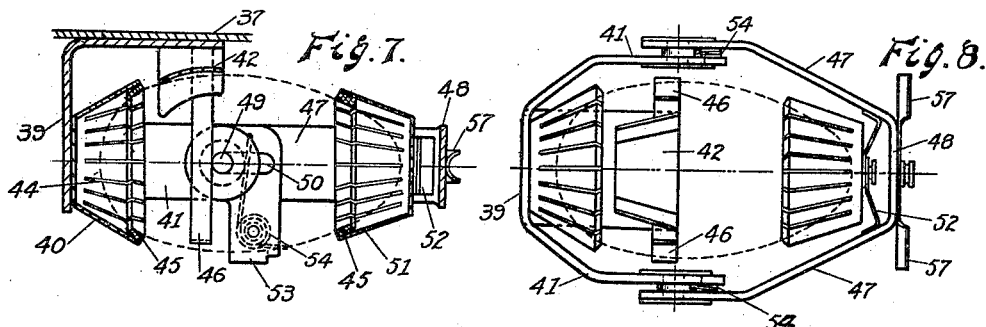
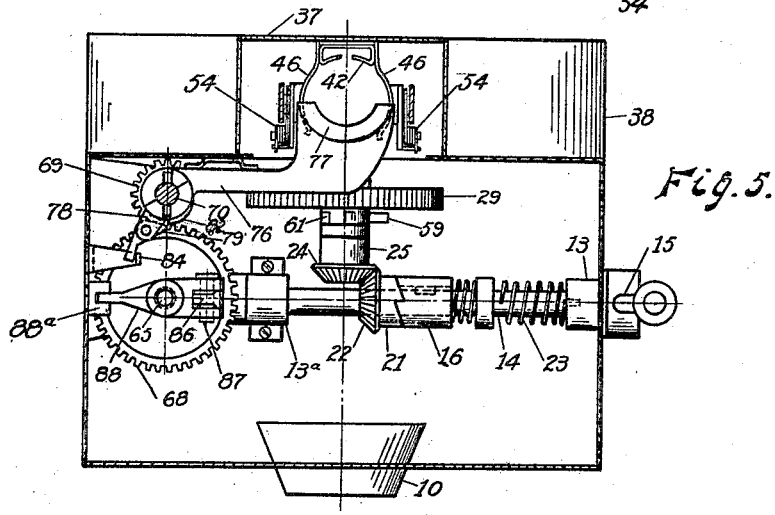
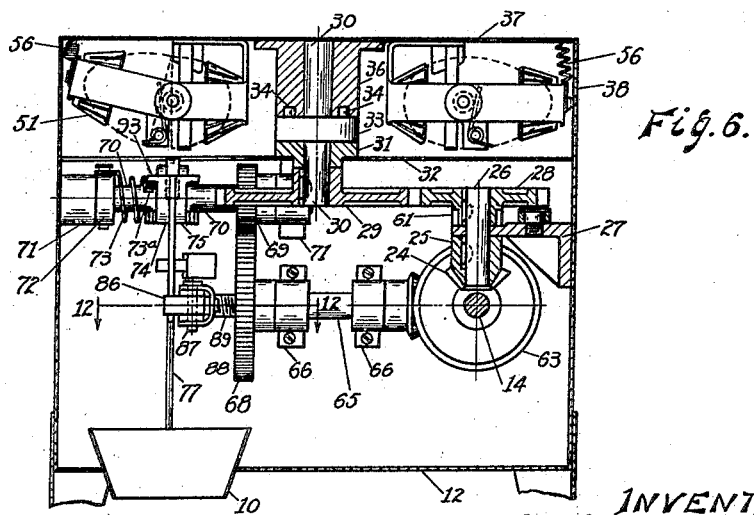
INVENTOR
William C. White
BY Wright Brown Quimby & May
ATTORNEYS

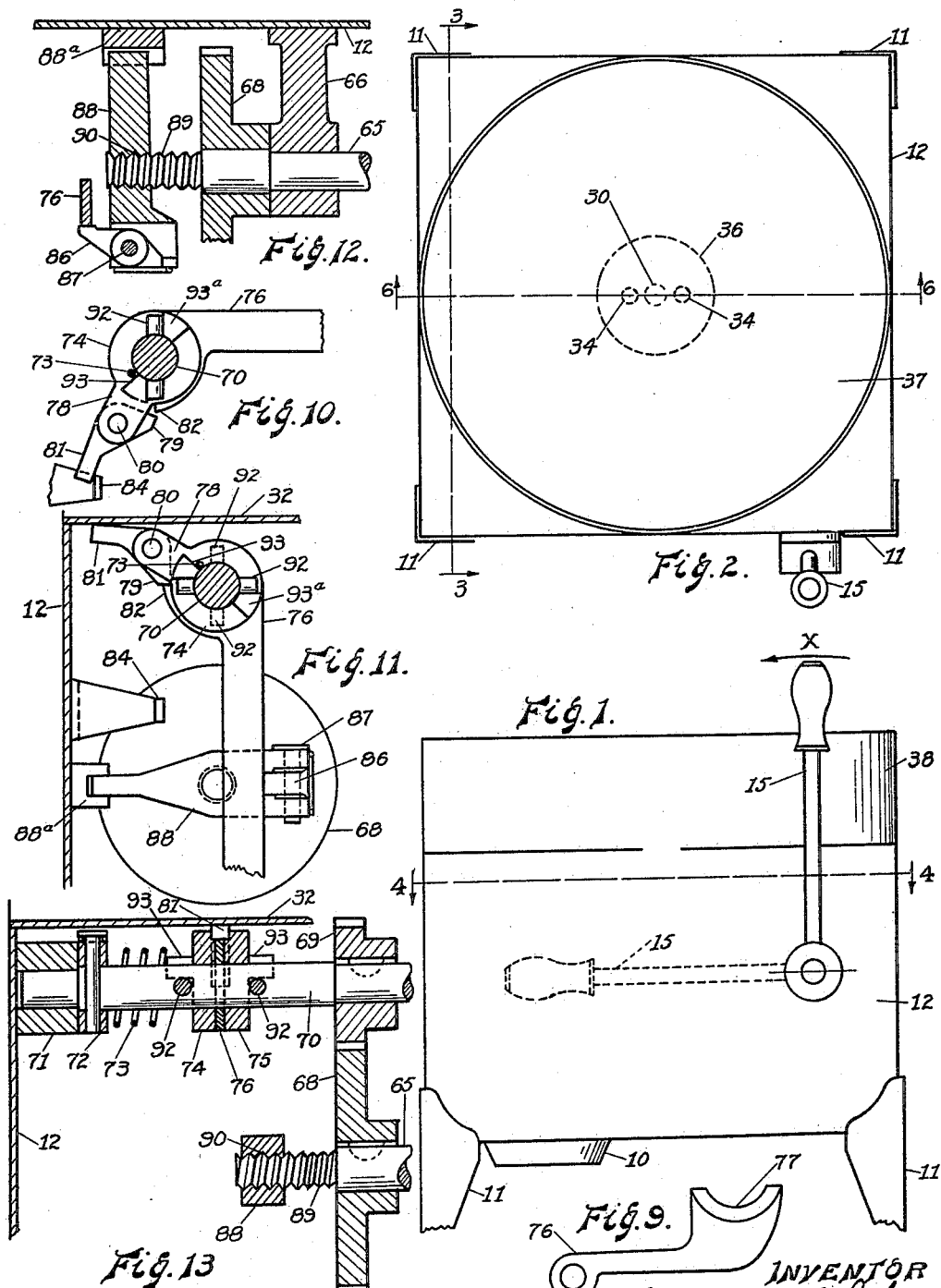

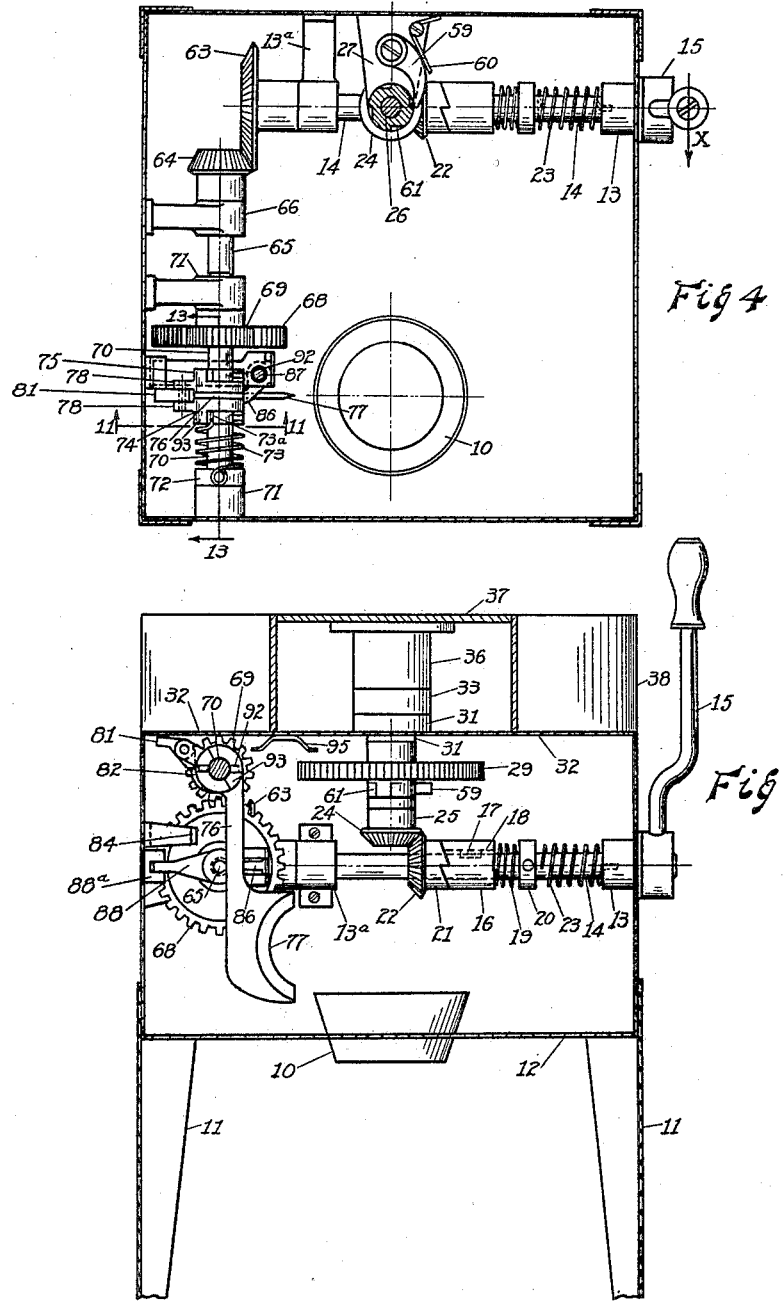

UNITED STATES PATENT OFFICE.

WILLIAM C. WHITE, OF PORTSMOUTH, NEW HAMPSHIRE.

EGG-SHUCKER.

1,397,306.    Specification of Letters Patent.    Patented Nov. 15, 1921.

Application filed March 9, 1921. Serial No. 451,004.

*To all whom it may concern:*

Be it known that I, WILLIAM C. WHITE, a citizen of the United States, residing at Portsmouth, in the county of Rockingham and State of New Hampshire, have invented new and useful Improvements in Egg-Shuckers, of which the following is a specification.

The object of this invention is to provide a compact, efficient, and conveniently operated machine adapted for use at soda fountains, and elsewhere, for cutting open the shells of eggs, and permitting the egg substance to fall from the shell into a receptacle placed below the machine, without liability of breakage of the yolks, of smearing any parts of the machine, and of mixing shell fragments with the substance.

The invention is embodied in the improvements which I will now proceed to describe and claim.

Of the accompanying drawings forming a part of this specification,—

Figure 1 is a side elevation of a machine embodying the invention.

Fig. 2 is a top plan view of the same.

Fig. 3 shows the casing in section on the plane of line 3—3 of Fig. 2, and the mechanism at the right of said line in elevation.

Fig. 4 is a section on the plane of line 4—4 of Fig. 1, and a plan view of the mechanism below said line, the knife hereinafter described being lowered.

Fig. 5 is a view similar to Fig. 3, showing the knife raised.

Fig. 6 is a section on line 6—6 of Fig. 2.

Fig. 7 shows a longitudinal section of one of the egg holders hereinafter described, and a portion of the turret supporting said holders.

Fig. 8 is a bottom plan view of the egg holder shown by Fig. 7.

Fig. 9 is a side view of the knife separated from the machine.

Fig. 10 is a side view of one of the collars engaged as hereinafter described with the knife shank.

Fig. 11 is a section on line 11—11 of Fig. 4.

Fig. 12 is a section on line 12—12 of Fig. 6.

Fig. 13 is a section on line 13—13 of Fig. 4.

The same reference characters indicate the same parts in all of the figures.

The casing or frame 12 of the machine is mounted on legs 11, and is preferably box-shaped, and includes a bottom in which is a funnel-shaped outlet or chute 10 for the egg substance released by the operation of the machine.

In bearings 13 and 13$^a$ on upright side walls of the casing 12 is journaled a rock-shaft 14, to the outer end of which is fixed an operating handle or lever 15. A one-way clutch member 16 is engaged with the rock-shaft to rotate therewith and to slide lengthwise thereon, by means of a key 17 and a groove 18 (Fig. 3). A spring 19 interposed between a fixed collar 20 on the rock-shaft and the clutch member 16, presses the latter yieldingly against a complemental one-way clutch member 21, mounted loosely on the rock-shaft and fixed to a bevel gear 22. The rock-shaft is normally held with the lever 15 in an upright position by a helical spring 23, attached at one end to the rock-shaft, and at the other end to the bearing 13, and in operating the machine the rock-shaft is first turned manually by swinging the lever in the direction of the arrow $x$ (Figs. 1 and 4), to a horizontal position (Fig. 5) against the stress of the spring 23. This manual movement of the rock-shaft is utilized to actuate the egg-cutting knife 77, hereinafter described, the clutch member 16 being caused during the manual movement of the rock-shaft to slip loosely on the clutch member 21, without turning the latter and the gear 22.

When the lever 15 is released, its return movement caused by the spring 23, is utilized to impart a partial rotation to a turret 37, which is adapted to carry eggs to position to be opened by the knife, this rotation of the rock-shaft turning the gear 22 through the clutch members 16 and 21, the teeth of which are operatively interengaged only during the movement imparted to the rock-shaft by the spring 23. The gear 22 is a part of the mechanism next described, for imparting a step-by-step rotation to the turret 37.

The gear 22 meshes with a bevel gear 24 having a hub 25, which is fixed to a vertical shaft 26, journaled in a bearing in a fixed bracket 27 (Fig. 4). A gear 28 is fixed to said shaft and meshes with a gear 29, fixed to a vertical shaft 30. This shaft is journaled in a fixed bearing 31, supported by the horizontal top member 32 of the casing. The shaft 30 has an enlargement 33, provided with studs 34, and constituting a coupling member which is detachably engaged with a coupling member 36, formed as a hub attached to the center of the turret 37, and bored to receive the upper end portion of the shaft 30.

The turret is a circular horizontal plate, and is surrounded by a fixed circular curb 38 on the upper end of the casing. Secured to the turret, and projecting downward therefrom within the curb 38, are egg holders, of which there may be any desired number, the construction of said holders being best shown by Figs. 7 and 8. Each egg holder includes a portion fixed to the turret and comprising an angular bracket 39, having a horizontal arm, fixed to the turret, and a vertical arm projecting downward from the turret, a cup 40 for one end of an egg, fixed to the vertical arm, ears 41 projecting from the bracket at opposite sides of the cup, and a rest 42 for the upper side of the egg fixed to the bracket. The cup 40 is frusto-conical, and preferably of resilient sheet metal, and is provided with slots 44, subdividing it into a plurality of resilient tongues, each having a block 45 of yielding frictional material, such as soft rubber, adapted to have a yielding frictional bearing on the egg shell.

The bracket 39 is preferably provided with resilient downwardly projecting curved ears 46, adapted to bear yieldingly on opposite sides of the egg. The egg holder also includes a portion which is movable relatively to the turret and to the fixed portion of the holder, and comprises a substantially U-shaped yoke composed of arms 47 and a neck 48 connecting the arms. The arms 47 are connected by pivotal studs 49 with the bracket ears 41, said ears being provided with slots 50 (Fig. 7), in which the studs 49 are movable. A cup 51 constructed like the cup 40, is connected with the yoke neck 48 by resilient strips 52. which yieldingly support the cup. The bracket ears 41 are provided with downwardly projecting extensions 53, supporting coiled portions of springs 54 having arm portions bearing on the pivot studs 49, and yieldingly holding said studs at the left hand ends of the slots 50, as viewed in Fig. 7. The springs, therefore, hold the cup 51 yieldingly at a suitable distance from the cup 40 to hold an egg of minimum length, and permit the cup 51 to yield from the cup 50 to accommodate a longer egg. The yoke neck 48 is connected with the turret by a biasing spring 56 (Fig. 6), adapted to swing the yoke and the cup 51 upward when the shell of an egg engaged with the cups is cut by the knife 77.

The yoke neck 48 is provided with finger rests 57, to enable the operator to conveniently pull on the yoke and draw the cup 51 away from the cup 40 to admit an egg.

The holders may be conveniently charged with eggs after the turret is lifted from the curb, this being permitted by the separable coupling members 33 and 36. An egg engaged with the two cups prevents the movable cup from being drawn upward by the spring 56, but when the shell is cut by the knife, the spring 56 acts to raise the cup 51, as shown at the left of Fig. 6, so that the cut shell is opened at its lower side, and the egg substance is released and drops through the funnel 10.

The direction of rotation of the turret is preferably counter-clockwise, and rotation in the opposite direction is prevented by a pawl 59, pivoted to the bracket 27, and pressed by a spring 60 against ratchet teeth 61, formed on the hub of the gear 28.

As previously stated, the initial movement manually imparted to the rock-shaft 14 by the operator, is utilized to operate the egg-opening knife 77, the mechanism for accomplishing this being next described.

To the inner end of the rock-shaft 14 is fixed a bevel gear 63, meshing with a smaller bevel gear 64, on a shaft 65, at right angles with the rock-shaft, and journaled in fixed bearings 66, (Fig. 4). To the shaft 65 is fixed a relatively large gear 68, meshing with a smaller gear 69, on a shaft 70. This shaft is journaled in a bearing 71 (Figs. 4 and 6), and to it is fixed a collar 72, to which is attached one end of a helical spring 73, the other end of which is bent at $73^a$ (Fig. 6) and engages a shoulder 93 on a collar 74, which is loose on the shaft 70. Between the collar 74 and a corresponding collar 75, also loose on the shaft 70, is mounted the shank 76 of the shell-cutting knife. The knife and the hub formed by said collars are adapted to be turned independently of each other on the shaft by the spring 73, when said spring is put under tension by the described manual movement of the rock-shaft 14 effected by the lever 15. The collars 74 and 75 are provided with ears 78, connected by a stud 80, on which a pawl 79 is pivoted, said ears and stud connecting the collars. The knife is locked in its depressed position by a detent 86, as hereinafter described, and its shank is provided with a tooth 82, adapted to be engaged by the pawl 79, and thus engage the collars 74 and 75 with the locked knife, and prevent the collars from turning when the spring 73 is being put under tension. When the knife is lowered, as shown by Fig. 3, an arm 81 on the pawl 79 strikes the top member 32 of the casing and moves the pawl to position to engage the tooth 82 on the knife shank 76, so that the turning of the collars by the spring 73, after the release of the knife by the detent 86, imparts a quick upward movement of the knife from the position shown by Fig. 3, to that shown by Fig. 5, the knife being thus caused to quickly sever the shell of an egg in an egg holder previously moved by the turret into the path of the knife. This movement of the knife causes the pawl arm 81 to encounter a fixed stop 84, which swings the pawl 79 out of engagement with the knife-shank tooth 82, as shown by Fig. 10, the knife being thus released, so that it falls by gravity to the position shown by Fig. 3. The knife is arrested in the last-mentioned position, by the above-mentioned detent 86, which is moved automatically into and out of the path of the knife shank by the mechanism next described.

The detent 86 is connected by a pivot stud 87 (Figs. 5, 6, and 12), with a detent carrier 88, which has a tapped socket 90, engaged with a threaded extension 89 of the shaft 65. Said carrier is slidably engaged with a fixed grooved guide 88ª which prevents the carrier from turning with the shaft extension 89, so that the rotation of said extension moves the carrier and detent. The shaft 65, which is turned in opposite directions through the described connections with the rock-shaft 14, when turned by the action of the rock-shaft spring 23, causes the slide 88 and the detent 86 to move outward on the threaded extension 89, or to the left as viewed in Figs. 6 and 12, thus moving the detent into position to arrest the knife, as shown by Figs. 3, 6, and 12. When the shaft 65 is turned in the opposite direction, the detent 86 is moved inward, or to the right as viewed in Fig. 6, thus withdrawing the detent from the path of the knife and permitting the described upward movement of the knife by the spring 73.

The shaft 70 is provided with pins 92, engaging the shoulders 93, and corresponding shoulders 93ª on the collars 74 and 75. The spring 73 always tends to press the ears 93 and 93ª against the pins 92, but when the pawl 79 is engaged with the knife tooth 82, and the knife is held by the detent 86, rotation of the shaft 70 caused by manual movement of the lever 15, 15, causes the pins to move away from the shoulders, as indicated by dotted lines in Fig. 11, and by full lines in Fig. 10. Upon the release of the knife by the detent 86, the collars are forced by the spring to the position shown by Figs. 5 and 10, and are stopped in said position by the pins. Upon the release of the lever 15 the pins and collars are returned by the spring 23 to the position shown by Figs. 3 and 11.

A buffer spring 95 is attached to the top member 32 of the casing, in position to yieldingly arrest the knife in its raised position, and cause it to return quickly to its starting position.

The operation is as follows:

At the commencement the egg-holders are provided with eggs; the turret 37 is positioned with one holder in the path of the knife 77, the knife being in its lowest position and locked by the detent 86; the lever 15 is held by the spring 23 in its raised position, and the knife-raising spring 73 is free from tension. The operator then swings the lever in the direction of arrow $x$, through an angle of ninety degrees, until the lever is horizontal. This movement of the lever is caused through the rock-shaft 14 and the described connections between the rock-shaft and the knife-raising spring 73, to put said spring under tension, at the same time gradually displacing the detent 86, and without moving the turret.

When the lever 15 reaches its horizontal position, as in Fig. 5, the knife-raising spring is under tension, and the detent 86 has moved to the right out of the path of the knife-shank 76, thus releasing the knife and causing it to snap up to position to sever the egg shell, as shown in Fig. 5. At this particular instant the pawl arm 81 hits the stop 84, thus disengaging the pawl 79 from the knife-shank tooth 82, and allowing the knife 77 to fall to the position shown by Fig. 3. The above-described action takes place just as the lever 15 reaches its horizontal position. The lever 15 is held down by the operator in its horizontal position until the egg substance drops to the receptacle placed under the funnel 10.

On release of the lever, the spring 23 returns it to the position shown in Fig. 3, and during its return the clutch member 16 engages with the clutch member 21, which transmits motion through the described connections to the turret, the latter being thus partially rotated to bring another egg-holder in position in the path of the knife.

It will be seen that the shafts 65 and 70 are rocked or reversely rotated simultaneously with the rock-shaft 14, and that said rock-shafts constitute elements of a turret and knife-operating mechanism which is common to the turret and to the knife. To distinguish the several rock-shafts from each other, I call the rock-shaft 14 the primary rock-shaft, the rock-shaft 65 the secondary rock-shaft, and the rock-shaft 70, the intermediate rock-shaft.

I claim:

1. An egg-shucker comprising, in combination, a turret, a plurality of egg-holders movable by the turret in a circular path, an oscillatory knife movable in a path which intersects the path of the egg-holders, and operating mechanism including knife-actuating means for causing an oscillatory movement of the knife, and means for rotating the turret step-by-step, said mechanism being organized to hold the egg-holders successively in the path of the knife, and to partially rotate the turret while the knife is out of the path of the egg-holders.

2. An egg-shucker substantially as specified by claim 1, said mechanism including a rock-shaft adapted to be manually turned in one direction, and a spring adapted to be put under tension by the manual movement of the rock-shaft, and to turn the latter in the opposite direction.

3. An egg-shucker substantially as specified by claim 1, said mechanism including a rock-shaft adapted to be manually turned in one direction, and a spring adapted to be put under tension by the manual movement of the rock-shaft, and to turn the latter in the opposite direction, said knife-actuating means including a knife-throwing spring, a knife-arresting detent, and connections between said rock-shaft and the said throwing-spring and detent, adapted to put the spring under tension while the detent is operative, and to displace the detent to permit the action of the spring.

4. An egg-shucker substantially as specified by claim 1, said mechanism including a rock-shaft adapted to be manually turned in one direction, a spring adapted to be put under tension by the manual movement of the rock-shaft, and to turn the latter in the opposite direction, and torque-transmitting connections between the rock-shaft and the turret, comprising a one-way clutch, operable to cause rotation of the turret in one direction, means being provided for preventing a reverse rotation of the turret.

5. An egg-shucker substantially as specified by claim 1, said mechanism including a rock-shaft adapted to be manually turned in one direction, a spring adapted to be put under tension by the manual movement of the rock-shaft, and to turn the latter in the opposite direction, and torque-transmitting connections between the rock-shaft and the turret, comprising a one-way clutch, operable to cause rotation of the turret in one direction, means being provided for preventing a reverse rotation of the turret, said connections comprising also a separable coupling permitting the removal of the turret.

6. An egg-shucker including a rotary turret, and a plurality of egg-holders mounted thereon, each of said egg-holders comprising two opposed cups adapted to be held coaxial with each other by an interposed egg, one of said cups being fixed to the turret and the other yieldingly held at a minimum distance from the fixed cup, and pivotally connected with the latter to swing out of axial alinement therewith when an egg shell is severed, a biasing spring being provided to swing the pivotally connected cup out of axial alinement with the fixed cup.

7. An egg-shucker substantially as specified by claim 6, each cup being normally contracted to conform to a relatively small egg, and expansible to conform to a larger egg.

8. An egg-shucker substantially as specified by claim 6, each cup being of resilient material and slotted to form resilient sections.

9. An egg-shucker substantially as specified by claim 6, each cup being of resilient material and slotted to form resilient sections, said sections being provided with compressible blocks to contact with an egg.

10. An egg-shucker comprising a rotary turret, a bracket fixed thereto, and provided with spaced apart slotted ears, egg cups fixed to the bracket between said ears, a yoke having pivot studs adapted to turn and slide in the slots of said bracket, a movable cup connected with said yoke, springs connected with the bracket arms and yoke, and adapted to yieldingly hold the movable cup at a minimum distance from the fixed cup, and a biasing spring connecting the yoke with the turret, the yoke being adapted to swing on the bracket ears, and normally held by the biasing spring with the movable cup out of axial alinement with the fixed cup.

11. An egg-shucker substantially as specified by claim 10, the said bracket being provided with a rest and with a pair of resilient fingers, said rest and fingers arranged to bear on portions of an egg.

12. An egg-shucker substantially as specified by claim 10, the movable cup being yieldingly connected with the yoke, and provided with finger rests, whereby the yoke and movable cup may be moved outwardly from the fixed cup.

13. An egg-shucker comprising in combination, a turret, a plurality of egg-holders movable by the turret in a circular path, an oscillatory knife movable in a path which intersects the path of the egg-holders, and operating mechanism common to the turret and knife, and comprising a primary rock-shaft adapted to be manually turned in one direction, a spring adapted to be put under tension by the manual movement of the primary rock-shaft and to turn the latter in the opposite direction, a secondary rock-shaft, an intermediate rock-shaft, said primary, secondary, and intermediate rock-shafts being connected to rotate in unison, connections between the primary rock-shaft and the turret, a knife-projecting spring connected with the secondary rock-shaft, connections between said spring and the knife, a detent movable into and out of the path of the knife, and connections between the detent and the intermediate rock-shaft.

14. An egg-shucker comprising in combination, a turret, a plurality of egg-holders movable by the turret in a circular path, an oscillatory knife movable in a path which intersects the path of the egg-holders, and operating mechanism common to the turret and knife, and comprising a primary rock-shaft adapted to be manually turned in one direction, a spring adapted to be put under tension by the manual movement of the primary rock-shaft and to turn the latter in the opposite direction, a secondary rock-shaft, an intermediate rock-shaft, said primary, secondary, and intermediate rock-shafts being connected to rotate in unison, a one-way clutch, and gearing coöperating therewith to impart a unidirectional step-by-step rotation from the primary rock-shaft to the turret, a knife-projecting spring connected with the secondary rock-shaft, connections between said spring and the knife, a detent movable into and out of the path of the knife, and connections between the detent and the intermediate rock-shaft.

15. An egg-shucker comprising in combination, a turret, a plurality of egg-holders movable by the turret in a circular path, an oscillatory knife movable in a path which intersects the path of the egg-holders, and operating mechanism common to the turret and knife, and comprising a primary rock-shaft adapted to be manually turned in one direction, a spring adapted to be put under tension by the manual movement of the primary rock-shaft and to turn the latter in the opposite direction, a secondary rock-shaft on which the knife is mounted to oscillate, an intermediate rock-shaft, said primary, secondary, and intermediate rock-shafts being connected to rotate in unison, connections between the primary rock-shaft and the turret, a knife-projecting torsional spring fixed at one end to the secondary rock-shaft, separable connections between the opposite end of the spring and the knife, including a pawl and a pawl-engaging tooth on the knife, a detent movable into and out of the path of the knife, and connections between the detent and the intermediate rock-shaft.

16. An egg-shucker comprising in combination, a turret, a plurality of egg-holders movable by the turret in a circular path, an oscillatory knife movable in a path which intersects the path of the egg-holders, and operating mechanism common to the turret and knife, and comprising a primary rock-shaft adapted to be manually turned in one direction, a spring adapted to be put under tension by the manual movement of the primary rock-shaft and to turn the latter in the opposite direction, a secondary rock-shaft, an intermediate rock-shaft, said primary, secondary, and intermediate rock-shafts being connected to rotate in unison, connections between the primary rock-shaft and the turret, a knife-projecting spring connected with the secondary rock-shaft, connections between said spring and the knife, a carrier having a knife-arresting detent, and movable to hold said detent alternately in and out of the path of the knife, and screw-thread connections between said carrier and the intermediate rock-shaft whereby the carrier is reciprocated by rotary movements of the said rock-shaft, means being provided for preventing the carrier from turning with the intermediate rock-shaft.

In testimony whereof I have affixed my signature.

WILLIAM C. WHITE.